United States Patent [19]
Whitsel et al.

[11] Patent Number: 5,640,542
[45] Date of Patent: Jun. 17, 1997

[54] ON-CHIP IN-CIRCUIT-EMULATOR MEMORY MAPPING AND BREAKPOINT REGISTER MODULES

[75] Inventors: Ronald J. Whitsel; William A. Hobbs, both of Beaverton, Oreg.

[73] Assignee: Intel Corporation, Santa Clara, Calif.

[21] Appl. No.: 583,310

[22] Filed: Jan. 5, 1996

Related U.S. Application Data

[63] Continuation of Ser. No. 145,757, Oct. 29, 1993, abandoned.

[51] Int. Cl.⁶ ........................................ G06F 9/445
[52] U.S. Cl. ............... 395/500; 395/183.04; 395/183.1
[58] Field of Search ........................... 395/500, 183.04, 395/800, 375, 183.1

[56] References Cited

U.S. PATENT DOCUMENTS

| | | | |
|---|---|---|---|
| 4,674,089 | 6/1987 | Poret et al. | 371/25 |
| 4,740,895 | 4/1988 | Sargent et al. | 395/183.01 |
| 4,796,258 | 1/1989 | Boyce et al. | 395/183.05 |
| 4,901,259 | 2/1990 | Watkins | 364/578 |
| 4,939,637 | 7/1990 | Pawloski | 395/500 |
| 4,964,074 | 10/1990 | Suzuki et al. | 395/500 |
| 5,047,926 | 9/1991 | Kuo et al. | 364/267.91 |
| 5,056,013 | 10/1991 | Yamamoto | 364/247.6 |
| 5,123,107 | 6/1992 | Mensch, Jr. | 395/800 |
| 5,132,971 | 7/1992 | Oguma et al. | 371/16.2 |
| 5,226,047 | 7/1993 | Catlin | 371/16.2 |
| 5,228,039 | 7/1993 | Knoke et al. | 395/183.04 |
| 5,280,626 | 1/1994 | Kondo et al. | 395/500 |
| 5,313,618 | 5/1994 | Pawloski | 395/500 |
| 5,321,828 | 6/1994 | Phillips et al. | 395/500 |
| 5,325,512 | 6/1994 | Takahashi | 395/500 |
| 5,333,307 | 7/1994 | Shirk et al. | 395/183.04 |
| 5,357,626 | 10/1994 | Johnson et al. | 395/500 |
| 5,383,192 | 1/1995 | Alexander | 395/500 |
| 5,396,611 | 3/1995 | Kusuda | 395/550 |
| 5,537,536 | 7/1996 | Groves | 395/183.04 |
| 5,539,901 | 7/1996 | Ramirez | 395/500 |

OTHER PUBLICATIONS

Designing a VLSI microprocessor for emulation by Rivin, 1990 I.E.E.E publication pp. p5–8.1,p5–8.4.
An In–circuit analyzer for mixed signal digital signal processor by Beline et al, I.E.E.E. publication pp. 1109–1112, (1991).

*Primary Examiner*—Krisna Lim
*Assistant Examiner*—Zarni Maung
*Attorney, Agent, or Firm*—Blakely, Sokoloff, Taylor & Zafman

[57] ABSTRACT

A pair of In-Circuit-Emulator modules are embedded within a microprocessor to implement parts of an In-Circuit-Emulator system. A first In-Circuit-Emulator module, the In-Circuit-Emulator memory mapping module, maps specified physical addresses into a debug memory. The physical addresses mapped into the debug memory are set by programmable registers. The second In-Circuit-Emulator module, the In-Circuit-Emulator breakpoint module, allows the user to set conditions that cause the processor to recognize specific bus events. The In-Circuit-Emulator breakpoint module monitors an internal bus and an internal bus controller. The user can set specific bus event conditions by writing to a set of breakpoint registers in the breakpoint module.

7 Claims, 7 Drawing Sheets

| | 3 1 | | | | 1 1 6 5 | | | | | | 2 1 0 | |
|---|---|---|---|---|---|---|---|---|---|---|---|---|
| PHYSICAL ADDRESS MATCH 0 | | | | | | | | | | | | IDR0 |
| DATA MATCH 0 | | | | | | | | | | | | IDR1 |
| PSYICAL ADDRESS MATCH 1 | | | | | | | | | | | | IDR2 |
| DATA MATCH 1 | | | | | | | | | | | | IDR3 |
| | | | | | | | | SMM 1 | SMM 0 | | | IDR4 |
| | DBN 1 | IIO 1 | MIO 1 | RW 1 | LEN 1 | PI 1 | EBC 1 | MC 1 | DEN 0 | IIO 0 | MIO 0 | RW 0 | LEN 0 | PI 0 | EBC 0 | MC 0 | IDR5 |

ON-CHIP IN-CIRCUIT-EMULATOR MEMORY MAPPING AND BREAKPOINT REGISTER MODULES

This is a continuation of application Ser. No. 08/145,757, filed Oct. 29, 1993, now abandoned.

FIELD OF THE INVENTION

The present invention relates to the field of In-Circuit-Emulators for debugging microprocessor based computer systems. More particularly, the present invention relates to logic embedded into a microprocessor that efficiently performs In-Circuit-Emulator functions.

BACKGROUND OF THE INVENTION

In-Circuit-Emulators are commonly employed to develop and debug computer systems including portable computer systems. A typical In-Circuit-Emulator provides a processor emulation module and a host computer. The processor emulation module emulates processor functions for a target computer system that is under development. The host computer controls the emulation functions. The processor emulation module is usually inserted into the target computer system in place of the target processor. The processor emulation module emulates the target processor according to user commands entered on the host processor.

Typically, such In-Circuit-Emulators perform a variety of emulation functions. For example, In-Circuit-Emulators usually perform emulation functions for downloading and modifying target system software and examining target system memory. In-Circuit-Emulators often provide a debug memory space that can be used instead of the target system memory. Such in-circuit emulators also commonly provide processor control functions such as execute code, halt execution, and execute code until the occurrence of a breakpoint condition.

Most prior art In-Circuit-Emulators comprise a processor emulation module that is inserted into the target computer system in place of the target processor. Such emulation modules introduce propagation delays into the computer system. Thus the computer system cannot be tested at full speed while using a prior art In-Circuit-Emulator. Furthermore, such prior art In-Circuit-Emulators often must monitor more than one external bus in order to provide breakpoints.

SUMMARY OF THE INVENTION

It is therefore an object of the present invention to reduce the propagation delays caused by an In-Circuit-Emulator.

It is a further object of the present invention to reduce the cost and complexity of In-Circuit-Emulators by eliminating the need to monitor external buses.

Other objects, features and advantages of the present invention will be apparent from the accompanying drawings, and from the detailed description and figures that follow. The present invention comprises two In-Circuit-Emulator modules that are embedded within a microprocessor. A first In-Circuit-Emulator module, the In-Circuit-Emulator memory mapping module, maps specified physical addresses into a debug memory. The physical addresses mapped into the debug memory are set by programmable registers. The second In-Circuit-Emulator module, the In-Circuit-Emulator breakpoint module, allows the user to set conditions that cause the processor to recognize specific bus events. The In-Circuit-Emulator breakpoint module monitors an internal bus and an internal bus controller. The user can set specific bus event conditions by writing to a set of breakpoint registers in the breakpoint module.

BRIEF DESCRIPTION OF THE DRAWINGS

The present invention is illustrated by way of example and not limited by the figures of the accompanying drawings in which like references indicate similar elements, and in which.

NOTION AND NOMENCLATURE

The detailed descriptions which follow are presented largely in terms of algorithms and symbolic representations of operations within a computer system. These algorithmic descriptions and representations are the means used by those skilled in the data processing arts to convey the substance of their work most effectively to others skilled in the art.

Generally, and within the context of this application, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method operations in operating a computer and the method of computation itself. The present invention relates to method steps for operating a computer in processing electrical or other physical signals (e.g., mechanical, chemical) to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

An on-chip In-Circuit-Emulator system that provides debug memory mapping and breakpoints is disclosed. In the following description, for purposes of explanation, specific nomenclature is set forth to provide a thorough understanding of the present invention. However, it will be apparent to one skilled in the art that these specific details are not required in order to practice the present invention. Furthermore, well known circuits and devices are shown in block diagram form in order not to obscure the present invention unnecessarily.

ICE Memory Mapping

Figure 1:
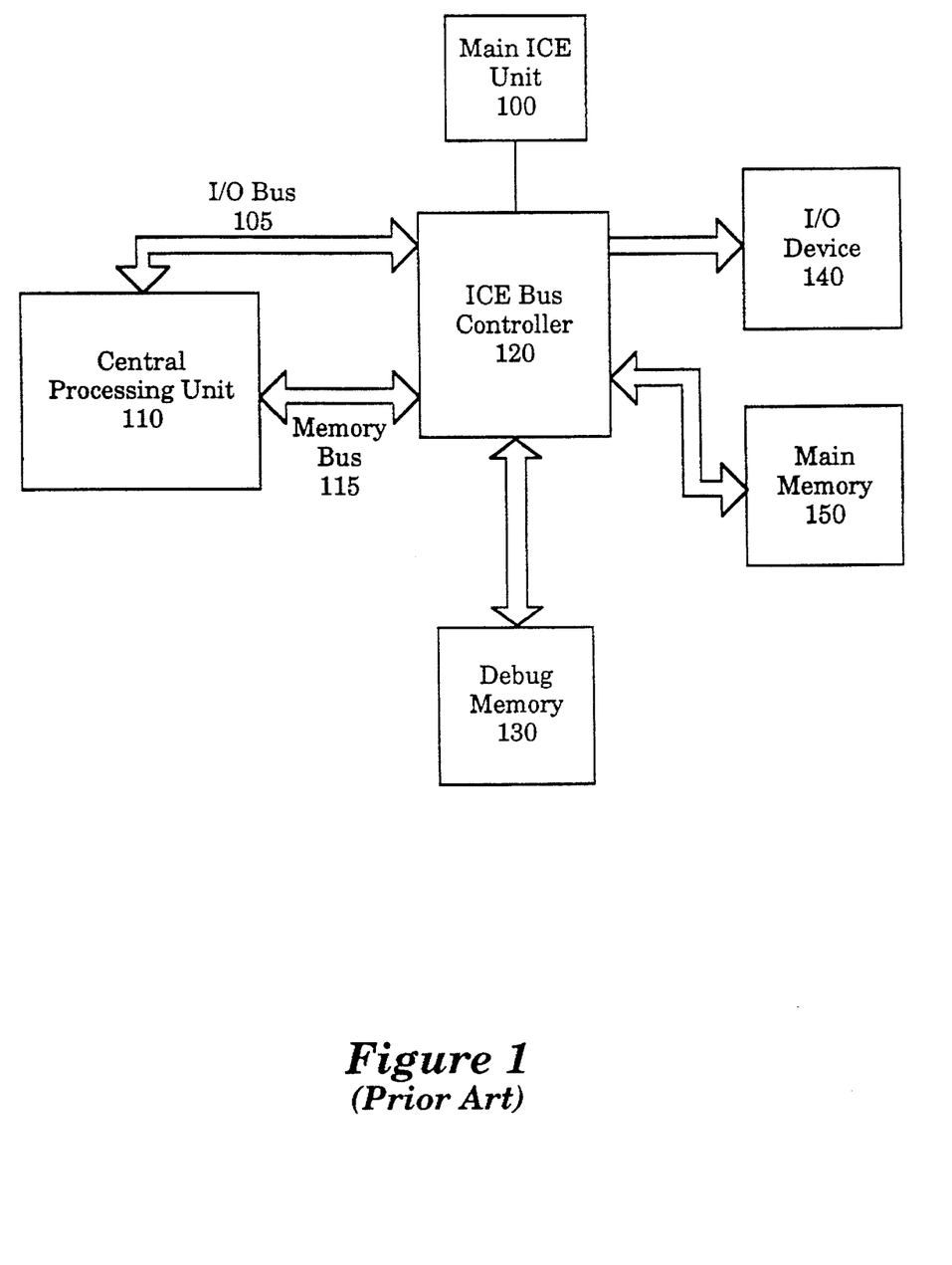
FIG. 1 illustrates a computer system with a prior art In-Circuit-Emulator memory mapping system.

FIG. 1 illustrates a prior art computer system comprising a central processing unit (CPU) 110, a main memory 150, and an I/O device 140. The central processing unit (CPU) 110 is coupled to an I/O device 140 by an I/O system bus 105. The central processing unit (CPU) 110 is also coupled to a main memory 150 by a memory bus 115. While developing the computer system, the main memory 150 and I/O device 140 may not operate properly and require debugging. To help debug the computer system, an In-Circuit-Emulator (ICE) system is used. The In-Circuit-Emulator monitors and controls transactions on the buses using an In-Circuit-Emulator bus controller 120 to help the user debug the computer system.

An In-Circuit-Emulator usually contains a memory address space that can be used to supply information to the computer system being developed. FIG. 1 also illustrates a debug memory 130 that comprises the memory address space for an In-Circuit-Emulator. To access the debug memory 130, an In-Circuit-Emulator bus controller 120 monitors the memory bus for special addresses. When the In-Circuit-Emulator bus controller 120 detects a bus cycle on the memory bus 115 containing one of the special addresses, the In-Circuit-Emulator bus controller 120 directs the bus cycle to the debug memory 130.

The In-Circuit-Emulator system depicted in FIG. 1 is typical of the prior art. Such prior art In-Circuit-Emulator systems limit the speed at which the central processing unit 110 can operate since the In-Circuit-Emulator bus controller 120 introduces propagation delays into the computer system.

The present invention proposes an In-Circuit-Emulator memory mapping system that is contained on the microprocessor silicon die itself. By placing the In-Circuit-Emulator memory mapping system on the microprocessor silicon die, significantly less propagation delay is introduced into the computer system by the In-Circuit-Emulator.

Figure 2:
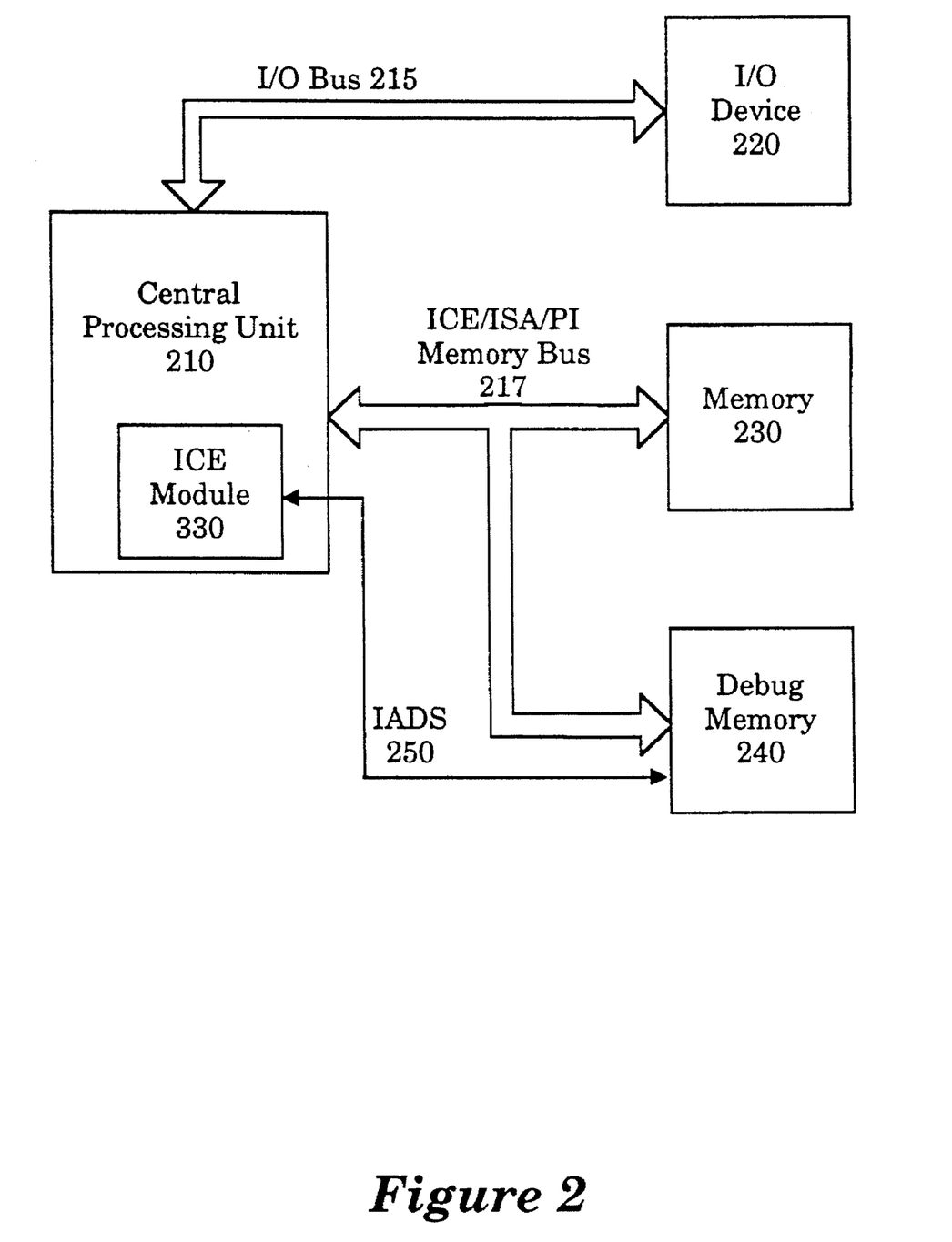
FIG. 2 illustrates a computer system with an In-Circuit-Emulator memory mapping system as disclosed by the present invention.

FIG. 2 illustrates a computer system equipped with the ICE memory mapping system of the present invention. Note that in the ICE memory mapping system of the present invention there is no bus controller that splits either of the external buses thus eliminating the propagation delays introduced into the system by the prior art. Referring to FIG. 2, the debug memory 240 is coupled to the memory bus 217 just like the main memory 230. However, one special line, called the ICE Address Data Strobe (IADS) 250, couples an ICE module 330 in the central processing unit 210 to the debug memory 240. The central processing unit 210 asserts the ICE Address Data Strobe (IADS) 250 line when a bus cycle should be directed to the debug memory 240 instead of the main memory 230.

Figure 3:
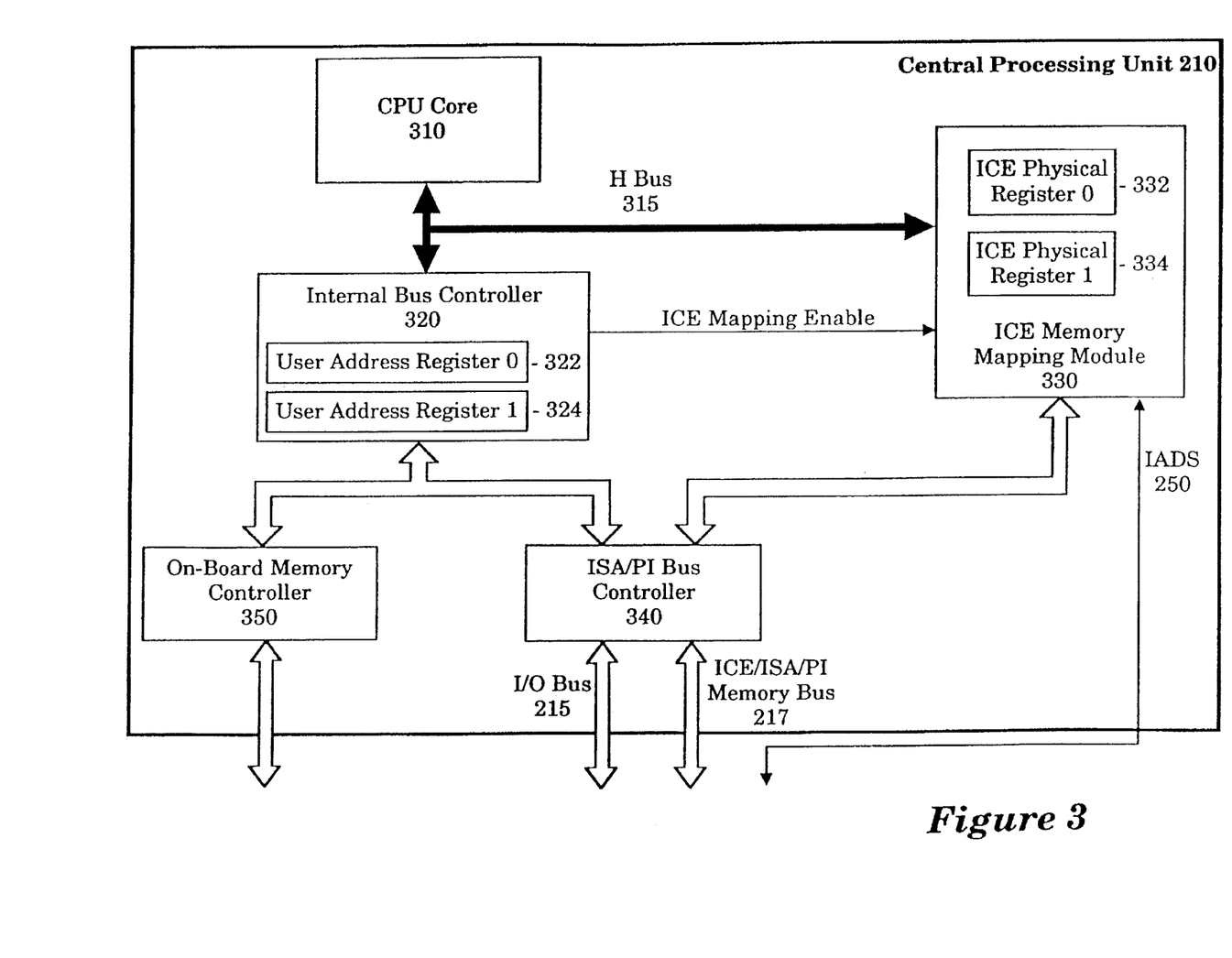
FIG. 3 illustrates a block diagram of a microprocessor containing the In-Circuit-Emulator memory mapping system of the present invention.

FIG. 3 illustrates an internal block diagram of the central processing unit 210. The central processing unit 210 contains a central processing unit core 310 that performs the actual computer processing. Coupled to the central processing unit core 310 is an internal bus referred to as the H bus 315. The H bus 315 is further coupled to an internal bus controller 320. The internal bus controller 320 functions as a bus transceiver for an ISA/PI bus controller 340 and a memory controller 350.

To direct bus cycles to the debug memory 240 illustrated in FIG. 2, the central processing unit 210 contains an internal ICE memory mapping module 330. Referring back to FIG. 3, the internal ICE memory mapping module 330 is coupled to the FI bus 315 and to the internal bus controller 320. The internal bus controller 320 contains a pair of match registers (User Address Registers 322 and 324) that are used to activate the internal ICE memory mapping module 330 when a match occurs. A user sets User Address Registers 322 and 324 to address values that the user desires to have mapped into the debug memory 240 address space. When the internal bus controller 320 detects a match between the H bus 315 and one of the User Address Registers, the internal bus controller 320 activates the internal ICE memory mapping module 330. The internal ICE memory mapping module 330 then generates a physical address using a pair of registers, asserts the ICE Address Data Strobe (IADS) line 250, and routes the generated physical address to the debug memory 240.

Figure 4:
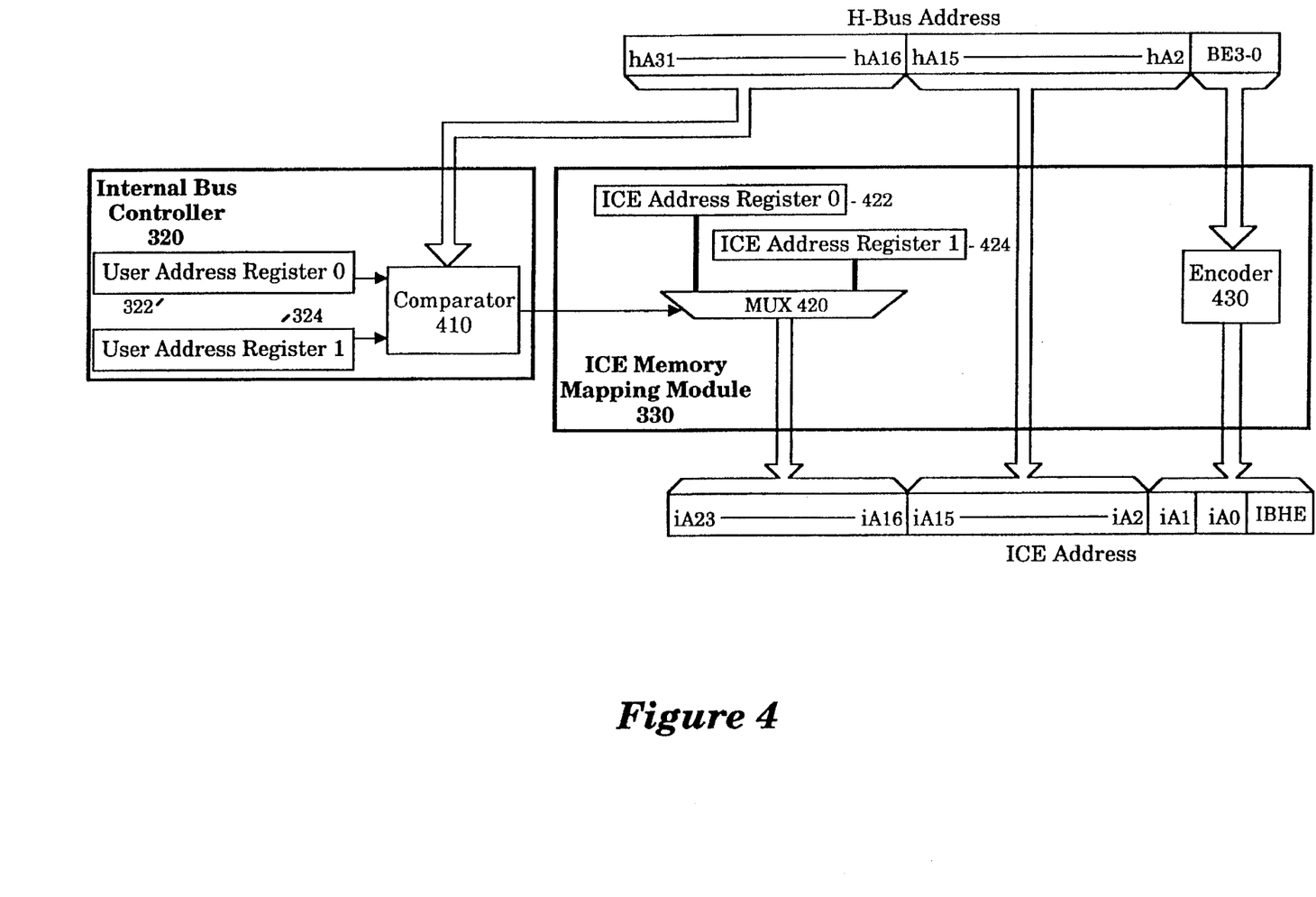
FIG. 4 illustrates a block diagram of the In-Circuit-Emulator memory mapping module that monitors an internal microprocessor bus and generates ICE Addresses when a match occurs.

FIG. 4 illustrates a block diagram of the internal bus controller 320 and the ICE memory mapping module 330. At the top of FIG. 4, the incoming H bus address is illustrated. The upper 16 bits of the H bus address are directed into a comparator 410. The comparator 410 compares the upper 16 bits of the H bus address with 16 bits provided by the user in the User Address Registers 322 and 324. If the address on the upper 16 bits of the H bus address matches the 16 bits in either of the User Address Registers 322 and 324, the ICE memory mapping module 330 directs the bus cycle to the debug memory 240 by generating a physical address and asserting the ICE Address Data Strobe (IADS) line 250.

To generate a physical address for the debug memory 240, the ICE memory mapping module 330 first encodes the four byte enable bits (BE3-BE0) into low address bits (A1 and A0) and a byte high enable bit using encoder 430. The next fourteen address bits are taken directly from the H bus address and passed through unmodified. Finally, for the upper 8 bits, the ICE memory mapping module 330 uses bits from the value stored in a pair of 8 bit long ICE Address Registers 422 and 424. If the value on the H bus matches the value in the first User Address Register 322, then the 8 bits in the first ICE Address Register 422 are used. Otherwise, if the value on the H bus matches the value in the second User Address Register 324, then the 8 bits in the second ICE Address Register 424 are used. A multiplexor 420 controlled by comparator 410 directs the proper ICE Address Register into the upper 8 bits of the ICE physical ddress.

To operate the internal ICE memory mapping module 330, the central processing unit 210 must be reset while asserting a special ICE input pin (not shown) high. The user then sets address ranges to be mapped into the debug memory 240 address space by setting the User Address Registers 322 and 324 in the internal bus controller 320. A user sets the User Address Registers by executing an I/O write instruction to reserved I/O address. The user will only be able to execute the I/O write instruction to the reserved I/O address if the central processing unit 210 was reset while asserting the special ICE input pin.

Figure 5:
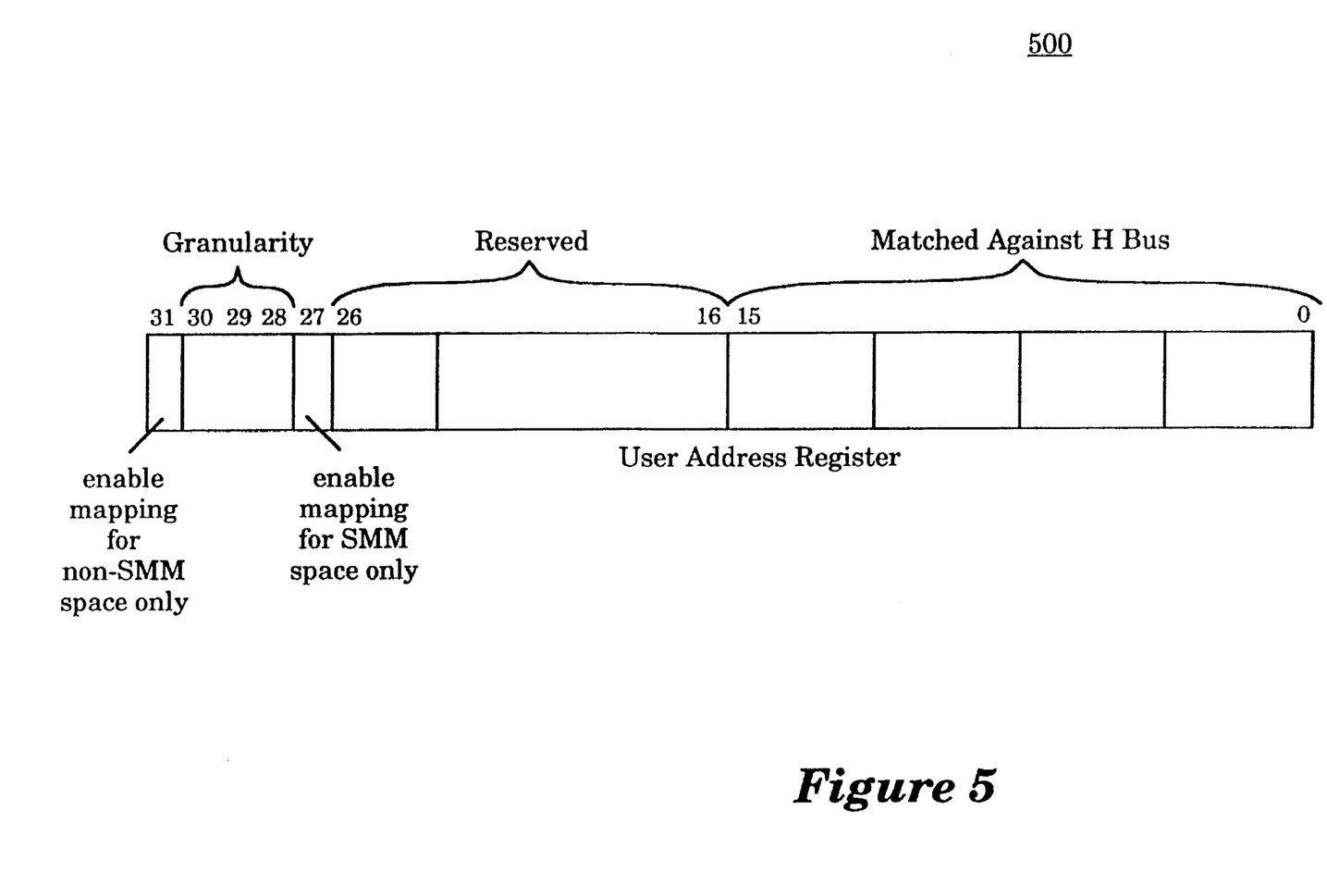
FIG. 5 illustrates the User Address Register (UAR) that is compared against the internal microprocessor bus.

FIG. 5 illustrates the components of a User Address Register. The least significant 16 bits of a User Address Register are matched against the most significant 16 bits of the H bus value. The number of bits compared depends upon the granularity setting in bits 28–30 of the User Address Register. To map 64K of memory into the debug memory, the users sets the granularity bits such that all 16 bits are compared during the comparison. If the user wants to map more memory, the user changes the granularity bits to specify that less bits be compared, down to a minimum of 12 bits such that 1 Meg of memory is mapped.

Finally, two control bits in the User Address Register specify how the mapping system should treat the system memory mode (SMM). If bit 27 of a User Address Register is set, then ICE memory mapping is only enabled when the central processing unit is in the SMM mode. Alternatively, if bit 31 is set, then ICE memory mapping is only enabled when the central processing unit is not in SMM mode. However, if both bit 27 and bit 31 of the User Address Register are set, then ICE memory mapping is disabled such that no ICE memory mapping occurs.

ICE Breakpoints

Most In-Circuit-Emulators commonly offer a breakpoint system that allows a user to set certain conditions that will cause the central processing trait to halt execution. For example, a user can set the In-Circuit-Emulator to halt when the central processing unit accesses a particular address on an external bus.

In prior art In-Circuit-Emulators, the In-Circuit-Emulator monitors an external bus to detect when the central processing unit accesses a particular address. Some highly integrated central processing units have more than one external bus upon which a bus cycle may occur. Thus, in such systems the In-Circuit-Emulator must monitor all the different external buses.

For example, referring again to FIG. 1, a computer system with a prior art In-Circuit-Emulator system is illustrated. In the prior art In-Circuit-Emulator system illustrated in FIG. 1, the In-Circuit-Emulator system must monitor both the I/O bus 105 and the memory bus 115 coupled to the central processing unit 110. Monitoring multiple external buses increases the complexity and cost of the In-Circuit-Emulator system. Furthermore, the ICE external bus controller introduces propagation delays into the computer system as explained in the previous section.

The present invention proposes a on-chip breakpoint system that monitors only a single internal bus even if multiple external buses exist. The on-chip breakpoint system also monitors an internal bus controller that specifies which external bus, if any, each bus cycle is for.

Figure 6:
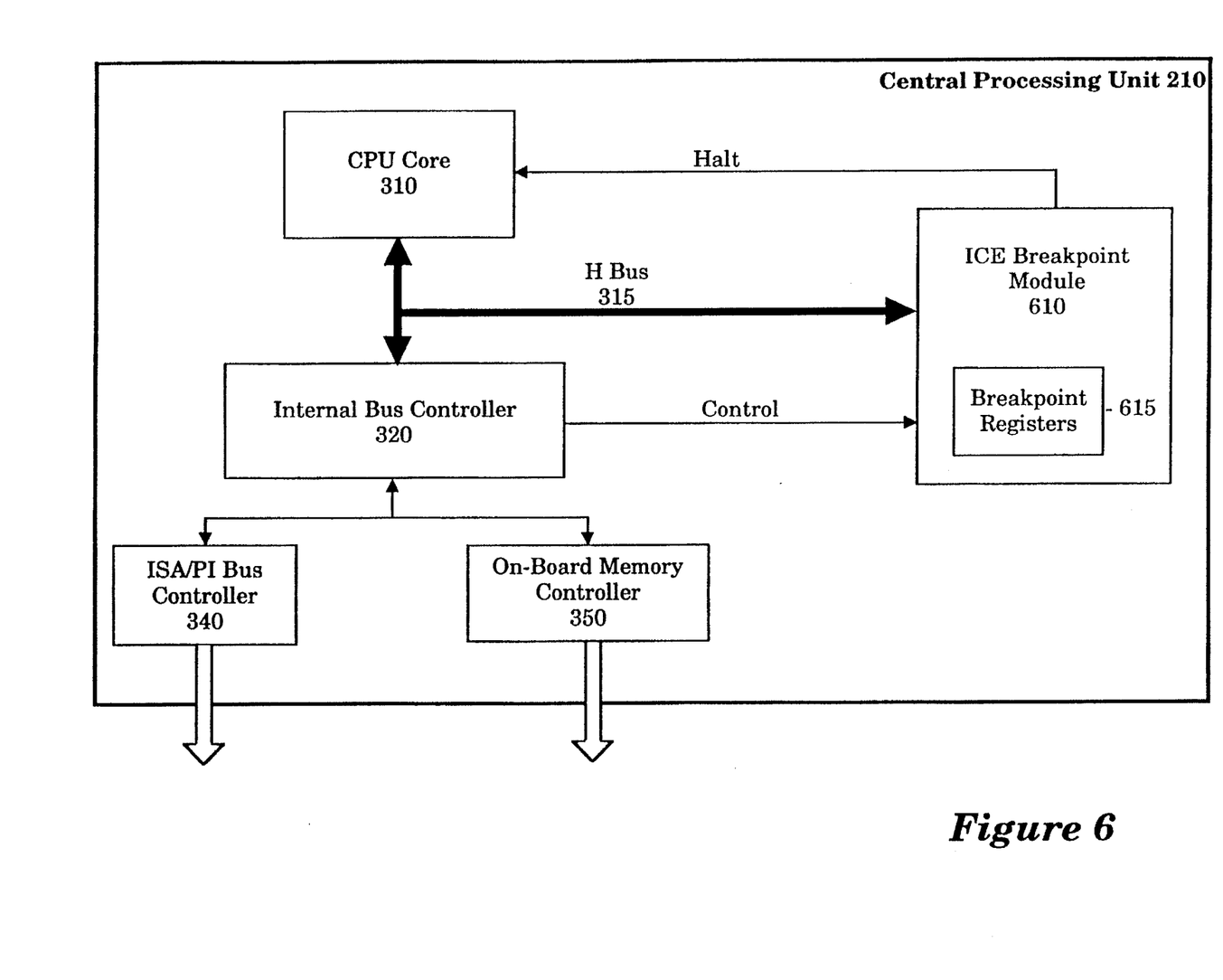
FIG. 6 illustrates an In-Circuit-Emulator breakpoint system that is embedded in a microprocessor.

Referring to FIG. 6, an internal block diagram of a central processing unit 210 containing the internal ICE breakpoint module of the present invention. The central processing unit 110 contains a central processing unit core 310 that performs the processing. Coupled to the central processing unit core 310 is an internal bus referred to as the H bus 315. The H bus 315 is further coupled to an internal bus controller 320. The internal bus controller 320 functions as bus transceiver for an ISA/PI bus controller 340 and an external memory controller 350. The ISA/PI bus controller 340 and the external memory controller 350 each control external buses.

In the present invention as illustrated in FIG. 6, an ICE Breakpoint module 610 is coupled to the internal H bus 315 of the central processing unit 210. The ICE Breakpoint module 610 is also coupled to the internal bus controller 320 such that the ICE Breakpoint module 610 receives certain control signals from the internal bus controller 320. Specifically, the control signals from the internal bus controller 320 inform the ICE Breakpoint module 610 which external bus, if any, each bus cycle is for. The ICE Breakpoint module 610 monitors the internal H bus 315 and the control signals from the internal bus controller 320 to detect certain conditions set by a user in a set of breakpoint registers 615.

Figure 7:
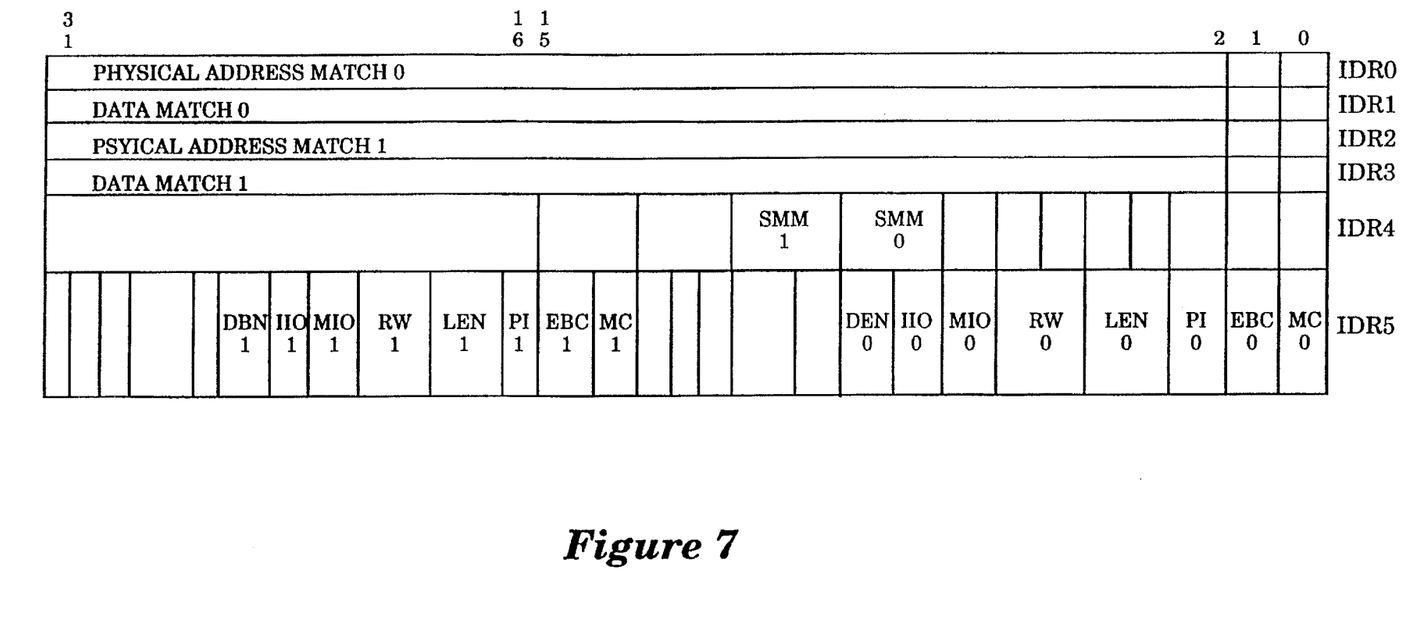
FIG. 7 illustrates the set of breakpoint registers used to control the In-Circuit-Emulator breakpoint system of FIG. 6.

The user sets the breakpoint conditions by setting the breakpoint registers 615 in the ICE Breakpoint module 610. FIG. 7 provides a detailed illustration of the set of breakpoint registers. The breakpoint registers comprise two physical address match registers, two data match registers, and two control registers. The physical address match registers are used to look for particular physical addresses on the H bus 315. The data match registers are used to look for particular data values on the H bus 315. The two control registers are used to set specific conditions to look for.

The following list provides the set of control bits available within the breakpoint two control registers:

SMM[i]: SMM space enable (00=disable breakpoints, 01=SMM mode, 10—non_SMM mode, 11—either mode)

MC[i]: Memory Controller space enable (0=disable, 1=enable)

EBC[i]: External (CISA) Bus Controller space enable (0=disable, 1=enable)

PI[i]: Peripheral Interface Bus Controller space enable (0=disable, 1=enable)

MIO[i]: Memory cycle or I/O cycle breakpoints (0=Memory cycle, 1=I/O cycle )

IIO[i]: Internal IO breakpoints (0=External or Internal bus cycle, 1=Internal bus cycle Only)

DEN[i]: Data Breakpoint Enable (0=Disabled, 1=Enabled)

RW[i]: Read/Write cycle bits (00=Reserved, 01=Data Write, 10=Data Read, 11=Data Read or Write)

LEN[i]: Breakpoint Field Width Encoding (00=1 byte, 01=2 bytes, and 11=4 bytes)

To modify the comparison parameters of the ICE Breakpoint module 610, the user simply sets the control bits in the control registers as desired. For example, if a user desires to have the central processing unit 210 halt when a particular physical address on the external Peripheral Interface (PI) bus is accessed, the user stores the physical address into one of the breakpoint physical address match registers and sets the PI control bit in the control register. When an access to the external Peripheral Interface (PI) bus occurs with the specified physical address, the ICE breakpoint module will halt the central processing unit core 310.

In the foregoing specification, the invention has been described with reference to specific exemplary embodiments thereof. However, it will be evident that various modifications and changes may be made thereto without departing from the broader spirit and scope of the invention as set forth in the following claims. Accordingly, the specification and drawings are to be regarded in an illustrative sense rather than a restrictive sense.

What is claimed is:

1. An improved computer processor, the improvement comprising:

a processor core;

an internal address bus coupled to said processor core, said internal address bus comprising a plurality of data lines, said internal address bus accessed during a plurality of bus cycles, a subset of said plurality of bus cycles being memory cycles;

an internal bus controller coupled to said internal address bus, said internal bus controller comprising at least one match register, said match register storing a match address, said internal bus controller comparing said match address in said match register against a bus address on said internal address bus during memory cycles, said match register further comprising at least one match granularity bits, said match granularity bits defining a size of the comparison done by said internal bus controller such that said match granularity bits determine a number of match address bits in said match register compared against said bus address on said internal address bus; and a memory mapping module, said memory mapping module mapping a memory cycle to an external debug memory when said internal bus controller detects a match.

2. The computer processor as claimed in claim 1 wherein said computer processor has more than one operating modes and wherein said match register further comprises at least one computer processor operating mode bits corresponding to said computer processor operating modes, said internal bus controller comparing a computer processor operating mode with said computer processor operating mode bits, said internal bus controller activating said memory mapping module when said computer processor mode bits match a current computer processor operating mode.

3. A method of mapping internal bus cycles in a computer processor with a single internal address bus and more than one external address bus to a debug memory, said method comprising the steps of:

determining if a bus cycle on said single internal address bus is a memory cycle;

comparing a bus address value on said single internal address bus in said computer processor against a match address in a match address register, said match register further comprising at least one match granularity bits, said match granularity bits defining a size of the comparison such that said match granularity bits determine a number of match address bits in said match register compared against said bus address on said internal address bus; and directing said bus address value on said single internal address bus to said debug memory if said bus address value on said single internal address bus matches said match address in said address match register.

4. The method of mapping internal bus cycles in a computer processor as claimed in claim 3 wherein said step of comparing is performed by an internal bus controller in said computer processor.

5. The method of mapping internal bus cycles in a computer processor as claimed in claim 3 wherein said method further comprises the steps of:

comparing a computer processor operating mode with at least one computer processor operating mode bit in said match register; and directing said bus address value on said single internal address bus to said debug memory if said computer processor operating mode matches said computer processor operating mode bit.

6. A computer processor, said computer processor comprising:

a processor core;

an internal address bus coupled to said processor core, said internal address bus comprising a plurality of data lines, said internal address bus accessed during a plurality of bus cycles, said bus cycles comprising a plurality of different types of bus cycles, one type of bus cycle comprises an external bus cycle;

an internal bus controller coupled to said internal address bus, said internal bus controller comprising at least one match register, said match register storing a match address, said internal bus controller comparing said match address in said match register against a bus address on said internal address bus during memory cycles, said match register further comprising at least one match granularity bits, said match granularity bits defining a size of the comparison done by said internal bus controller such that said match granularity bits determine a number of match address bits in said match register compared against said bus address on said internal address bus:

more than one external address bus, each of said external address buses coupled to said internal address bus through said internal bus controller;

an external bus indicator, said external bus indicator specifying on when an external bus cycle occurs on said internal data bus; and a breakpoint module coupled to said internal bus controller and said external bus indicator, said breakpoint module monitoring said internal address bus, said breakpoint module halting said computer processor upon when an external bus cycle occurs and a match of said match register with said address internal bus occurs.

7. A method of causing breakpoints in a computer processor, said computer processor having one internal address bus and more than one external address buses, said method comprising:

comparing a bus address on an internal address bus in said computer processor against breakpoint address in an breakpoint match register during a bus cycle said breakpoint match register comprising at least one match granularity bits, said match granularity bits defining size of the comparison done between said internal address bus and said breakpoint match register:

comparing an external bus destination indicator with an external bus bit in a breakpoint control register; and halting said computer processor if said bus address on said internal bus matches said breakpoint address in said breakpoint match register and said external bus destination indicator matches said external bus bit in said breakpoint control register.

* * * * *

UNITED STATES PATENT AND TRADEMARK OFFICE
CERTIFICATE OF CORRECTION

| | | |
|---|---|---|
| PATENT NO. | : | 5,640,542 |
| DATED | : | June 17, 1997 |
| INVENTOR(S) | : | Whitsel et al. |

It is certified that error appears in the above-identified patent and that said Letters Patent is hereby corrected as shown below:

In column 4 at line 22 delete "FI bus" and insert --H bus--

In column 5 at line 35 delete "trait" and insert --unit--

Signed and Sealed this

Eleventh Day of November, 1997

Attest:

BRUCE LEHMAN

Attesting Officer

Commissioner of Patents and Trademarks